R. M. KENNEY.
DOUBLE RAKE.
APPLICATION FILED FEB. 11, 1910.
972,539.
Patented Oct. 11, 1910.
2 SHEETS—SHEET 1.
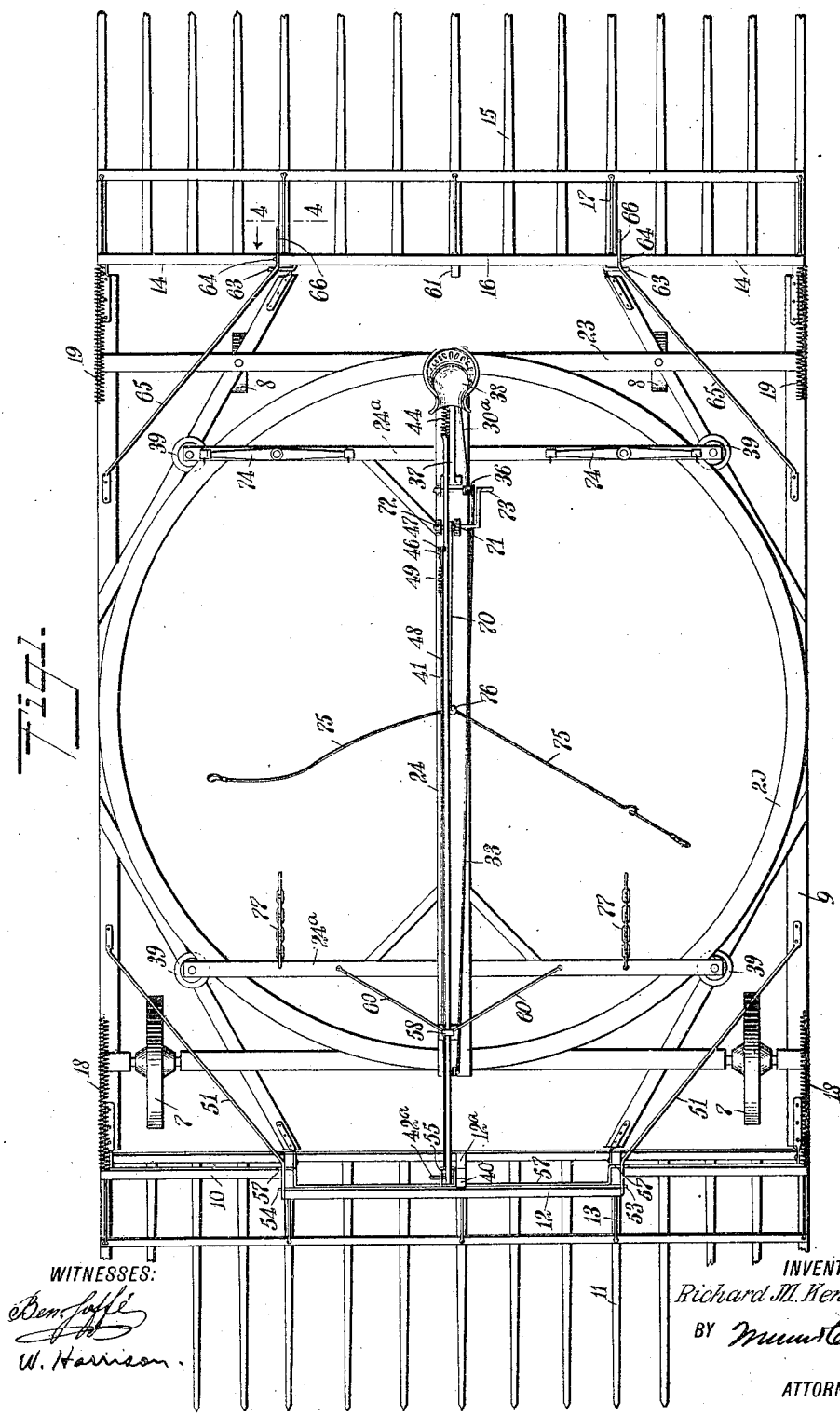
WITNESSES:
INVENTOR
Richard M. Kenney
BY
ATTORNEYS R. M. KENNEY.
DOUBLE RAKE.
APPLICATION FILED FEB. 11, 1910.
972,539.
Patented Oct. 11, 1910.
2 SHEETS—SHEET 2.
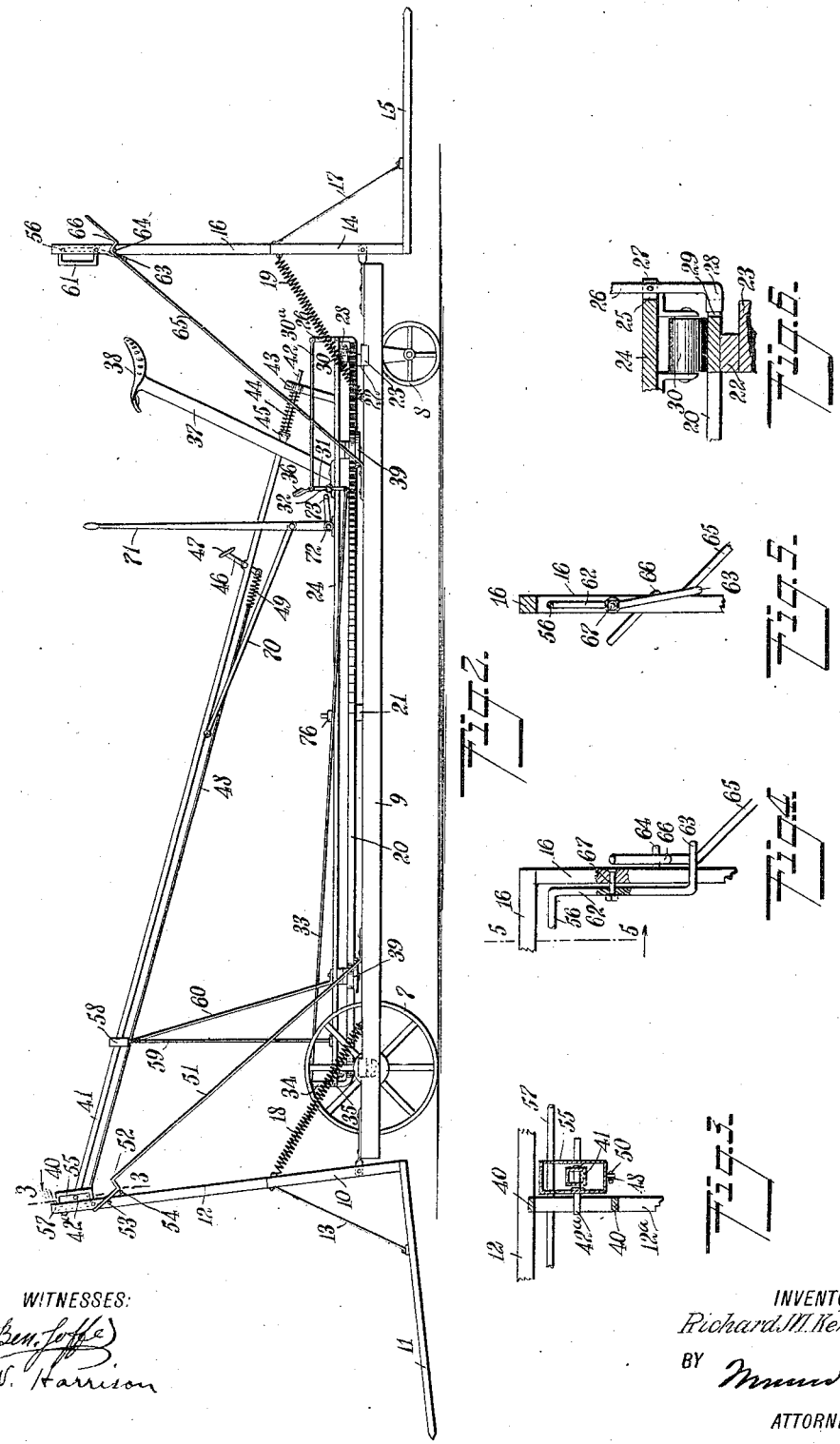
WITNESSES:
INVENTOR
Richard M. Kenney
BY 
ATTORNEYS

UNITED STATES PATENT OFFICE.

RICHARD M. KENNEY, OF CLINTON, OKLAHOMA.

DOUBLE RAKE.

972,539. Specification of Letters Patent. Patented Oct. 11, 1910.

Application filed February 11, 1910. Serial No. 543,223.

*To all whom it may concern:*

Be it known that I, RICHARD M. KENNEY, a citizen of the United States, and a resident of Clinton, in the county of Custer and State of Oklahoma, have invented a new and Improved Double Rake, of which the following is a full, clear, and exact description.

My invention relates to double rakes of the kind operated by aid of horses or other draft animals, my more particular purpose being to facilitate the handling of the rake heads by the driver while the latter occupies his seat upon the device.

My invention further relates to the improvement of rakes of the kind commonly known in this art as "horse rakes," my special purpose being to increase the general efficiency of such rakes.

A further purpose of my invention is to make certain specific improvements over my own construction of rake described in my Patent No. 909,607, dated January 12, 1909.

Reference is to be had to the accompanying drawings forming a part of this specification, in which similar characters of reference indicate corresponding parts in all the figures.

Figure 1 is a plan view of my improved rake; Fig. 2 is a side elevation of the same, showing one of the rake heads as down for the purpose of receiving the material to be operated upon; Fig. 3 is a section on the line 3—3 of Fig. 2, looking in the direction of the arrow, and showing certain details of the mechanism for raising and lowering the rake head; Fig. 4 is a section on the line 4—4 of Fig. 1, looking in the direction of the arrow, and showing some details of the latch mechanism for holding the rake head in different positions; Fig. 5 is a section on the line 5—5 of Fig. 4, looking in the direction of the arrow, and Fig. 6 is a detail sectional view, showing one of the rollers for supporting the turntable, and also showing one of the latches for holding the turntable in a fixed position.

Mounted upon wheels 7, 8 is a frame 9. At one end of the frame 9 is pivotally mounted a rake head 10 carrying rake teeth 11, provided with an upwardly-extending frame 12. The rake teeth are braced relatively to the rake head by aid of brace rods 13. At the opposite end of the frame 9 is another rake head 14, carrying rake teeth 15, which are braced by rods 17. The rake head 14 is provided with an upwardly-projecting frame 16, similar to the frame 12.

At 18, 19 are springs connecting the respective rake heads with the frame 9. This frame, because of its purpose, I designate as a "vehicle frame". Mounted rigidly upon this vehicle frame and supported by aid of blocks 21, 22 and cross beams 23 is a circular track 20. A turntable is shown at 24 and is provided with two notches exactly alike, one being shown at 25 in Fig. 6, the other being diametrically opposite this notch. Mounted within one of the notches 25 is a latch 26, mounted upon a pin 27 carried by the turntable and provided with a latch head 28. The latch head 28 is adapted to move into a notch 29 in the track 20, so as to hold the turntable in fixed position. The notches for the latch heads, as will hereinafter appear, are disposed in a plane coinciding with the general length of the vehicle frame and centrally of the same.

Mounted upon the under side of the turntable 24 are rollers 30, used for supporting it, these rollers running upon the track 20. A foot lever is journaled upon a pivot pin 32 carried by the turntable, and connected with this foot lever is a rod 30ª, which is also pivotally connected with the latch 26. Connected to the lower end of the foot lever 31 is a rod 33, which is connected with a latch 34, pivoted at 35 to the turntable 24 and adapted to move into a notch in the track 20 and corresponding to the notch 29 hereinbefore mentioned.

A seat post 37 is mounted rigidly upon the turntable and carries a seat 38 for supporting the weight of the operator. The turntable 24 is provided with cross beams 24ª, and mounted at the outer ends of the latter are stepped wheels 39, for steadying and guiding the turntable and also preventing undue friction in its rotational movements relatively to the frame 9. The frame 12 of the rake head 10 is provided with a center piece 12ª, and mounted rigidly upon the latter is a shoe 40.

A rod 41, of considerable length, is disposed above the turntable and is revoluble therewith, this rod being provided with a reduced portion 42 which extends through a bearing 43, this bearing having generally the form of an eye and being mounted rigidly upon the turntable. Encircling the reduced portion 42 is a spiral spring 44, which presses against a limiting stop 45 carried by the rod 41 and also presses against the bearing 43. The spring 44, by its tension, normally tends to force the rod 41 upwardly and to the left, according to Fig. 2.

Journaled upon the rod 41 is a foot lever 46, provided with a foot rest 47, the latter being disposed a little in front of the seat 38 for enabling the operator, while sitting upon this seat, to place his foot against the foot rest 47 and thereby rock the foot lever. A rod 48 is connected by a spring 49 with the lower end of the foot lever 46. The upper end of the rod 48 (see Fig. 3) is connected to a pivot pin 50 carried by a link 55, this link being journaled upon the rod 41 by aid of a pin 42ª, this pin supporting the link 55 and the upper end of the rod 48. By actuating the foot lever 46 the operator can cause the link 55 to rock within proper limits. The pin 42ª extends a little distance from each side of the link 55 so that one of these extending portions may extend through the slot in the shoe 40, as will be understood from Fig. 2 (upper left-hand corner) and Fig. 3.

Mounted upon the frame 9 and extending obliquely upward therefrom are spring rods 51 which are each provided near the upper end with a bent portion 52 serving, to some extent, the purpose of a latch, as hereinafter described. The frame 12 carries upon its opposite edges two pins 53, 54. Disposed within the frames 16, 12 and extending practically the width thereof are two rocking bars 56, 57, these two rocking bars being exactly alike. The rod 41 extends through an eye 58 which is supported upon a post 59 and steadied by aid of a brace 60, this post and brace being mounted rigidly upon the center of the turntable 24. The frame 16 is provided with a center piece carrying a shoe 61, the latter being similar to the shoe 40.

Each rocking bar 56, 57 is provided at its ends with bent portions 62 serving as cranks, the latter being provided with outwardly turned portions 63. The frame 16 is provided at its outermost edges with pins 64, and adjacent to the latter, and movable relatively to the same, are spring rods 65, provided with bent portions 66 serving the purpose of latches and adapted to engage and disengage the pins 64. The rocking bars 56, 57 are supported upon pivots 67, as will be understood from Figs. 2 and 5, and rock upon these pivots as centers.

Pivotally connected with the under side of the bar 41 is a pitman 70, the latter being connected with a hand lever 71, which is journaled at 72 upon the turntable and is provided with a foot lever 73. The operator can actuate the bar 41 by aid of either the hand lever 71 or the foot lever 73, or both, as desired. At 74 are swingletrees, to which horses or other draft animals may be secured in order to propel the vehicle. At 75 are head straps which are connected with a button 76. Rest chains are shown at 77 and form a portion of the harness.

The operation of my device is as follows: The draft animals being in position, the operator sits upon the seat 38. With the parts in the positions indicated in Fig. 2, the rake teeth 11 are down and are ready to receive a quantity of hay or the like. This being done, the operator next desires to tilt the rake head so as to raise the teeth 11 from the ground. To do this he grasps the hand lever 71 and at the same time, if he so desires, places his foot upon the foot lever 73. In doing this he pulls upon the pitman 70 and rod 41. The pin 42ª (see Fig. 3) extending through the shoe 40 (and having a reasonable play therein) causes the rake head to tilt and thereby raise the rake teeth. During this movement the spring bars 51 yield slightly and the bent portions 52 snap over the pins 53, thereby securely locking the rake head in position. The operator may now release the hand lever 71 and remove his foot from the foot lever 73 without fear that the rake teeth 11 will again descend. Suppose, now, that the operator desires to reverse the direction of travel of the rake. To do this he need not leave his seat and need not disconnect the draft animals. By placing his foot upon the foot piece 36 of the foot lever 31 he moves the rods 30ª, 33 and causes the latches 26, 34 to withdraw their heads from the notches 29, as will be understood from Figs. 2 and 6. This releases the turntable and leaves it free to turn. The operator next causes the draft animals to turn around, and in so doing the turntable is rotated until the draft animals face in the direction reverse to that in which they originally faced. This being done, the latch heads again enter the notches 29 and hold the turntable securely in position.

The half revolution of the turntable made as just described withdraws the pin 42ª (see Fig. 3) from the slot in the shoe 40. Toward the end of the half revolution the opposite end of the pin 42ª passes through the slot in the shoe 61. This leaves the apparatus in condition suitable for using the rake teeth 15. These rake teeth, like the rake teeth 11, can be raised or lowered at will by manipulating the hand lever 71 and foot lever 73 where the teeth 15 are to be lifted, and by pressing against the foot piece 36 whenever the latches 26, 34 are to be disengaged from the notches 29 in order to release the turntable and render it ready for another half-turn. The tension of the springs 18, 19 is such as to approximately counterbalance the weight of the rake teeth, so that no great effort by the operator is needed in tilting either of the rake heads, except such effort as is due to the weight of the hay or other material resting upon the rake teeth.

Having thus described my invention, I claim as new and desire to secure by Letters Patent:

1. A device of the character described, comprising a vehicle body, a turntable mounted thereupon, a rake head journaled upon said vehicle body, a shoe mounted upon said rake head and provided with a slot, a rod extending toward said shoe, a link mounted upon said rod and adapted to rock, means controllable at will from said turntable for rocking said link, and latches for holding said rake head in a predetermined position, said latches being so located as to be disengaged by movements of said link.

2. A device of the character described, comprising, a vehicle body, a track mounted thereupon, a turntable movable relatively to said track, latches carried by said turntable and adapted to grip the same rigidly in relation to said track, a seat mounted upon said turntable, and mechanism controllable at will by an operator sitting upon said seat for actuating said latches in order to allow said turntable to rotate.

3. A device of the character described, comprising a vehicle body, a turntable mounted thereupon, a rake head journaled relatively to the turntable and adapted to rock, mechanism including a rod movable in the general longitudinal direction of its length for rocking said rake head, means mounted upon said turntable for supporting said rod, and mechanism controllable from said turntable for actuating said rod.

In testimony whereof I have signed my name to this specification in the presence of two subscribing witnesses.

RICHARD M. KENNEY.

Witnesses:
PAULINE H. KENNEY,
BETTIE K. KENNEY.